March 7, 1939.   H. G. DAVIS   2,149,584
HOSE VALVE
Filed July 29, 1936   2 Sheets-Sheet 1
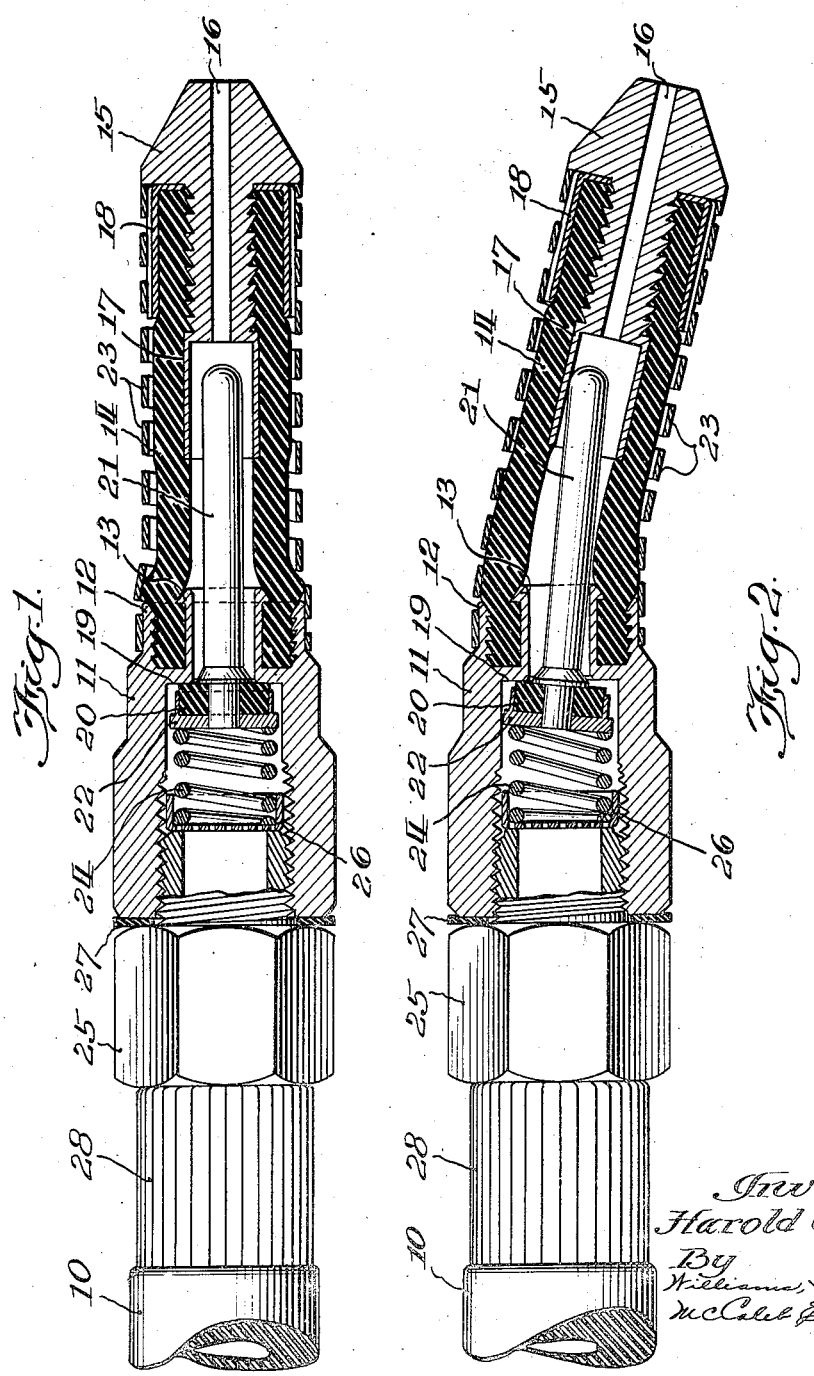
Inventor
Harold G. Davis
By
Williams, Bradbury,
McCaleb & Hinkle
Attys.

March 7, 1939.  H. G. DAVIS  2,149,584
HOSE VALVE
Filed July 29, 1936  2 Sheets-Sheet 2
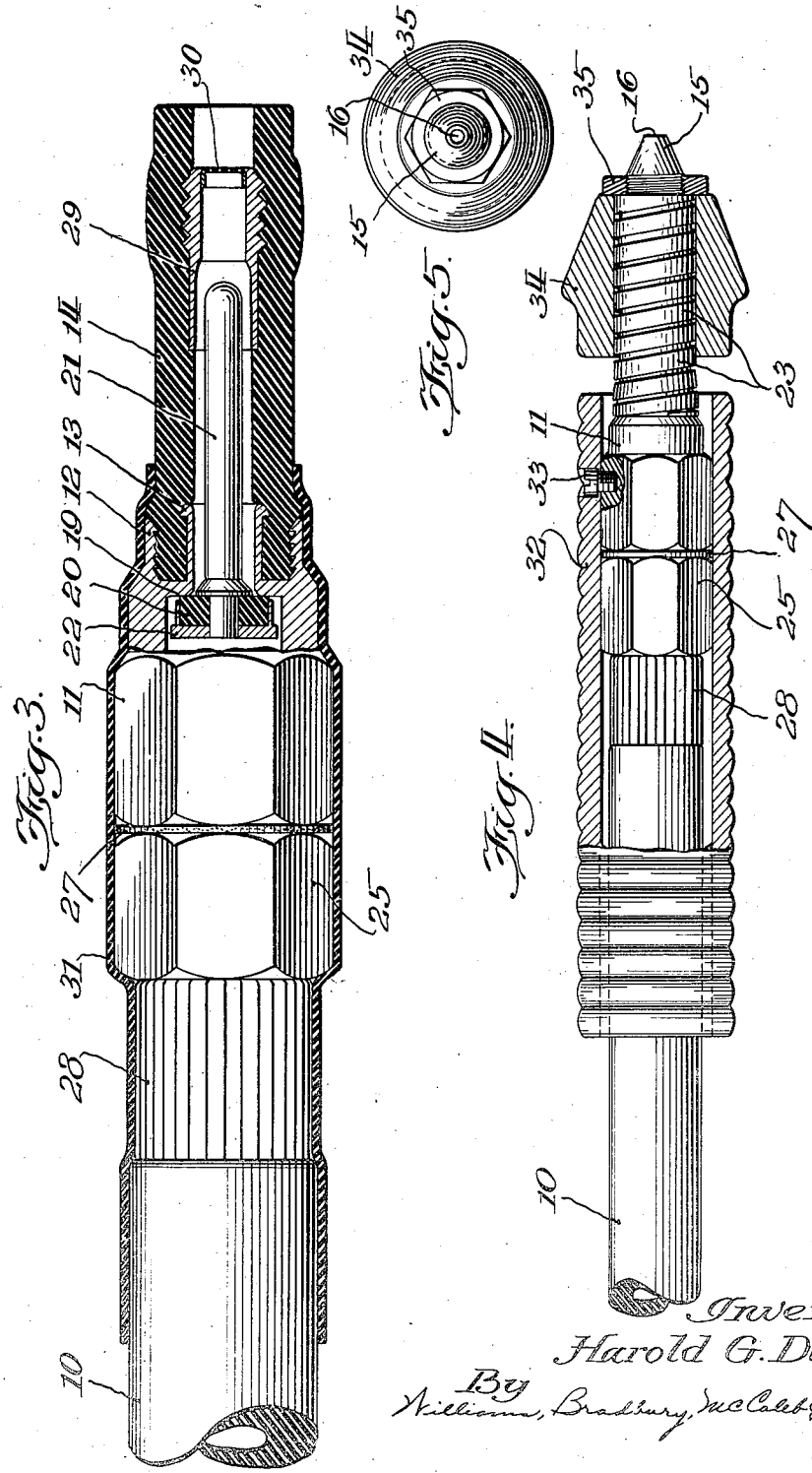
Inventor.
Harold G. Davis
By Williams, Bradbury, McCaleb & Hinkle
Attys Patented Mar. 7, 1939

2,149,584

UNITED STATES PATENT OFFICE 2,149,584

HOSE VALVE

Harold G. Davis, Denver, Colo.

Application July 29, 1936, Serial No. 93,187

1 Claim. (Cl. 251—115)

The invention relates to a hose valve that is opened by forcible flexing of a portion of the hose and automatically closed when that portion of the hose is permitted to straighten out. Its principal object is to provide a valve of improved durability and dependability. More specific objects and advantages are apparent from the description in which reference is had to the accompanying drawings, illustrating preferred embodiments of the invention.

Figure 1 is an elevation partly in section of a preferred form of valve combined with a nozzle for directing a narrow jet of fluid;

Fig. 2 is a view similar to Figure 1 showing the valve open;

Fig. 3 is an elevation partly in section of a hose valve combined with a nozzle for directing a wider stream of fluid constructed in accordance with the invention, of a type that is particularly adapted for use in automobile servicing without danger of scratching the automobile finish;

Fig. 4 is an elevation partly in section of a valve and nozzle constructed in accordance with the invention for the handling of steam and other hot fluids; and Fig. 5 is an elevation showing the outer end thereof.

These specific drawings and the specific description that follows are to disclose and illustrate the invention and are not to impose limitations upon the claim.

Valves embodying the present invention are generally connected at either their inlet or outlet side with a flexible hose for delivering fluid under pressure. If the valve has its inlet connected with a fixed pipe, as in the device of Cottrell Patent No. 1,864,978, it is customary for a hose of considerable length to be connected with the outlet side of the valve. In the devices illustrated in the accompanying drawings, however, the valve is located at the outlet end of the flexible hose 10.

The valve illustrated in all of the figures consists of a brass valve cage 11 having concentric outer and inner cylindrical flanges 12 and 13 extending from its outlet side. In the manufacture of the device, the end of a short length of Duprene hose 14 is inserted between the two concentric flanges 12 and 13, and the outer flange 12 is then shrunk inward by means of a suitable die to form a firm joint between the hose 14 and the valve cage 11. The outer flange 12 and the inner flange 13 are provided with suitable gripping members for anchoring the end of the hose in place.

In the device of Figures 1 and 2, a reinforcing brass tip 15 mounted on the end of the hose 14 is provided with a restricted passage 16 that causes the fluid to emerge in a narrow forcible jet. The tip 15 has a portion of reduced diameter extending inside the hose 14 integral with which is an inwardly extending sleeve 17.

In order to clamp the tip 15 to the hose 14, a brass ferrule 18 is shrunk upon the outer end of the hose to press that portion of the hose against suitable teeth provided upon the inwardly extending portion of the tip. Cooperating with a seat 19 in the valve cage 11 is a valve having its annular body portion 20 made of hard rubber. The end of the brass valve-operating stem 21 is used to rivet the rubber body portion in a brass cup 22, and the relative arrangement of the stem 21, the valve cage 11 and the inwardly extending sleeve 17 is such that the sleeve overlaps the end of the stem 17 substantially when the parts are in the normal position illustrated in Figure 1, but has its end substantially spaced from the joint between the valve cage 11 and the hose 14. Because of the substantial overlap between the sleeve 17 and the stem 21 in normal position, there is no danger that the end of the stem will slip out of the sleeve when the hose 14 is flexed; yet the distance between the sleeve 17 and the hose and valve cage joint is great enough to permit sufficient flexing of the hose 14 to operate the valve properly.

A spring 23 is coiled around the hose 14 in the device of Figure 1 to insure that the valve will continue to be self closing even though the hose 14 should lose its elasticity under heavy duty service or when hot fluids are used. The effectiveness of the spring 23 is enhanced if it is compressed between the valve cage 11 and the tip 15. It is also desirable for the spring to have one end fixed to the valve cage, and the securing of the spring to the valve cage may be conveniently effected by expanding the end of the spring over a portion of the valve cage in the manner illustrated in Figure 1.

When pressure is built up on the outlet side of the valve by reason of the use of a restricted nozzle, such as that of Figure 1, or when fluid is supplied to the valve at a low pressure, it is not desirable to rely upon the pressure of the incoming fluid alone for holding the valve on its seat. A coil spring 24 is, therefore, provided in the valve cage of Figure 1, which is compressed by screwing the brass nipple 25 of the hose 10 into the threaded end of the valve cage 11. A perforated brass cup 26 is held between the nipple 25 and the spring 24 to prevent foreign matter from entering the valve, and a rubber sealing gasket 27 is employed between the nipple 25 and the valve cage 11. The attachment of the nipple 25 to the hose 10 is effected by means of a brass ferrule 28 in the same manner as the attachment of the tip 15 to the hose 14.

If a sleeve of rigid wear- resistant material overlapping the end of the stem 21 were not employed, the stem would rapidly wear out the hose 14. Eventually it would wear a deep groove in the interior of the hose and the closing of the valve would be hindered by a tendency of the end of the stem to stick in the groove that it had worn in the rubber. In some cases it is highly advantageous to have no metal tip on the end of the hose 14, so that the hose itself constitutes the nozzle.

A protecting brass sleeve 29 may then be positioned wholly inside the hose 14 at the proper distance from the valve cage 11, as shown in Figure 3. The external teeth, by means of which the sleeve 29 is anchored inside the hose, should be different from the anchoring teeth shown in Figure 1, in that they afford equal resistance to movement of the sleeve 29 in either direction.

To provide an even stream of water and to prevent water from dripping from the nozzle after the valve is closed, a transverse foraminous member, such as the perforated brass cup 30, may be carried by the sleeve 29. The perforated cup 30 should be located a slight distance back from the end of the nozzle hose 14. A further safeguard against the scratching of automobile finishes may be provided by a sleeve of rubber or other elastic material that surrounds the valve cage 11 and extends to the nozzle hose 14. When the valve cage 11 is connected with a nipple, as in the device of Figure 3, a rubber sleeve 31 may be employed that extends from the supply hose 10 to the nozzle hose 14.

When the valve is used to convey hot fluids, a sleeve of thermally insulating material surrounding the valve cage and extending for a sufficient distance to serve as a handle may be employed. The insulating sleeve should comprise two sections spaced far enough apart at a point adjacent the hose that surrounds the valve stem to permit sufficient flexing of the hose for unseating the valve.

In Figure 4 a ribbed wooden sleeve 32 is fixed in place on a valve cage and associated parts that are of the same construction as those of Figure 1, by means of a set screw 33, and a wooden tip 34 is slipped upon the spring 23, being retained thereon by means of a nut 35 that is threaded on to the exterior of the brass tip 15. When hot fluids are used, the hose may be of steam stock instead of Duprene.

Changes in the devices illustrated in the drawings may be made and various devices embodying the substance of the invention may be constructed to meet various requirements.

I claim:

In a hose valve, the combination of a valve housing provided with a centrally located bore and counterbore, said housing having an annular seat between said bore and counterbore, a valve comprising a seating member arranged in said bore and having an axially extending stem located in said counterbore, said stem extending beyond said sleeve and being fixedly secured to said seating member, a flexible tubular hose carried by said sleeve and enclosing said stem, said hose being adapted to bend sufficiently to engage the end of said stem and rock said valve off its seat, a wear-resisting lining for said hose located in said flexible hose in a position to engage the end of said stem and overlapping a substantial portion of the end of the stem, whereby the bending of said flexible extension is limited to a portion thereof centrally located with respect to the stem, a spring coiled around the hose, having one end fixed to the valve cage and tending to maintain said hose in a coaxial position, and a spring engaging said seating member in said housing and normally urging said seating member in contacting engagement with the annular valve seat.

HAROLD G. DAVIS.